United States Patent
Garzaran et al.

(10) Patent No.: US 12,417,132 B2
(45) Date of Patent: Sep. 16, 2025

(54) ALGORITHMS FOR OPTIMIZING SMALL MESSAGE COLLECTIVES WITH HARDWARE SUPPORTED TRIGGERED OPERATIONS

(71) Applicant: Intel Corporation, Santa Clara, CA (US)

(72) Inventors: Maria Garzaran, Champaign, IL (US); Nusrat Islam, Bee Cave, TX (US); Gengbin Zheng, Austin, TX (US); Sayantan Sur, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1117 days.

(21) Appl. No.: 17/133,559

(22) Filed: Dec. 23, 2020

(65) Prior Publication Data
US 2021/0271536 A1    Sep. 2, 2021

(51) Int. Cl.
*G06F 9/54*    (2006.01)
*G06F 9/50*    (2006.01)

(52) U.S. Cl.
CPC ............ *G06F 9/546* (2013.01); *G06F 9/5072* (2013.01); *G06F 9/544* (2013.01)

(58) Field of Classification Search
CPC ......... G06F 9/546; G06F 9/5072; G06F 9/544
See application file for complete search history.

(56) References Cited

U.S. PATENT DOCUMENTS

2012/0233326 A1*  9/2012  Shaffer ................... H04W 4/70
                                                            709/225
2013/0246552 A1*  9/2013  Underwood ............ H04L 45/38
                                                            709/212
2014/0195688 A1*  7/2014  Archer .................. H04L 47/215
                                                            709/226
2016/0004610 A1*  1/2016  Knight ................ G06F 11/2028
                                                            714/4.11
2019/0213146 A1*  7/2019  Islam ........................ G06F 8/00

OTHER PUBLICATIONS

Carsten Viertel; Improving the Performance of Selected MPI Collective Communication Operations on InfiniBand Networks; Apr. 30, 2007; 62 pages (Year: 2007).*

* cited by examiner

*Primary Examiner* — Kevin L Young
*Assistant Examiner* — Kimberly L Jordan
(74) *Attorney, Agent, or Firm* — Compass IP Law PC

(57) ABSTRACT

Algorithms for optimizing small message collectives with hardware supported triggered operations and associated methods, apparatus, and systems. The algorithms are implemented in a distributed compute environment comprising a plurality of ranks including a root, a plurality of intermediate nodes, and a plurality of leaf nodes, where each of the plurality of ranks comprising a compute platform having a communication interface including embedded logic for implementing the algorithms. Collectives are employed to transfer data between parent ranks and child ranks. In connection with the collectives, control messages are sent from children of a collective to the parent of the collective informing the parent that the children of the collective have free buffers ready to receive data. The parent employs a counter to determine that a control message has been received from each of its children indicating each child has a free buffer prior to sending data to the children in the collective.

21 Claims, 9 Drawing Sheets

ALGORITHMS FOR OPTIMIZING SMALL MESSAGE COLLECTIVES WITH HARDWARE SUPPORTED TRIGGERED OPERATIONS

GOVERNMENT LICENSE RIGHTS

This invention was made with Government support under 8F-30005 awarded by DOE. The Government has certain rights in this invention.

BACKGROUND INFORMATION

High Performance Computing (HPC) has seen tremendous growth and interest in recent years. With the increased availability of processing resources, such as available through Infrastructure as a Service (IaaS) and Platform as a Service (PaaS) offerings provided by the likes of Amazon, Google, and Microsoft, individuals and companies that previously had no access to sufficient computing resources for performing complex tasks can now access those resources at very low cost. In addition, HPC is widely used within companies and at research universities for a large diversity of tasks, including machine learning, data mining, and complex modeling, among other tasks.

Under HPC, a computing task or set of related tasks is processed by distributing the workload across many compute nodes, with the number of nodes ranging from a few to into the millions. This is also referred to as parallel computing. Historically, HPC was performed on a so-called "supercomputer," which typically was a monolithic system employing thousands of processors configured in arrays. Today, the term supercomputer not only encompasses the foregoing monolithic systems, but also refers to systems having 1000's to millions of compute elements interconnected across high-speed networks.

In order to implement parallel computing, there needs to be a mechanism and associated communication model for communicating the code to be used for processing and associated data between the compute nodes. The de-facto communication model for HPC is the Message Passing Interface (MPI). MPI defines the syntax and semantics of a core of library routines useful to a wide range of users writing portable message-passing programs in Fortran or C. MPI can be run in environments, including tightly coupled, massively parallel machines (MPPs) and on networks of workstations (NOWs). In addition to standardized core library routines, MPI routines may be extended to support custom functionality.

MPI utilizes collective communication, which is a method of communication that involves participation of multiple processes in an HPC system. In a collective communication operation, many processes work together to move data in a specific communication pattern. For example, an "MPI_Allreduce" operation takes a value from each process, performs an arithmetic operation (e.g., sum) on all the values, and returns the result to every process. An implementation of "MPI_Allreduce" or other collectives can be expressed as an ordered series of data transfer and atomic operations executed on each process.

An implementation of "MPI_Allreduce" or other collectives can be expressed as an ordered series of data transfer and atomic operations executed on each process. Some of these operations may be performed by hardware in the HPC system, such as a network interface controller (NIC), network adaptor, host fabric interface (HFI) or a switch, for example.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
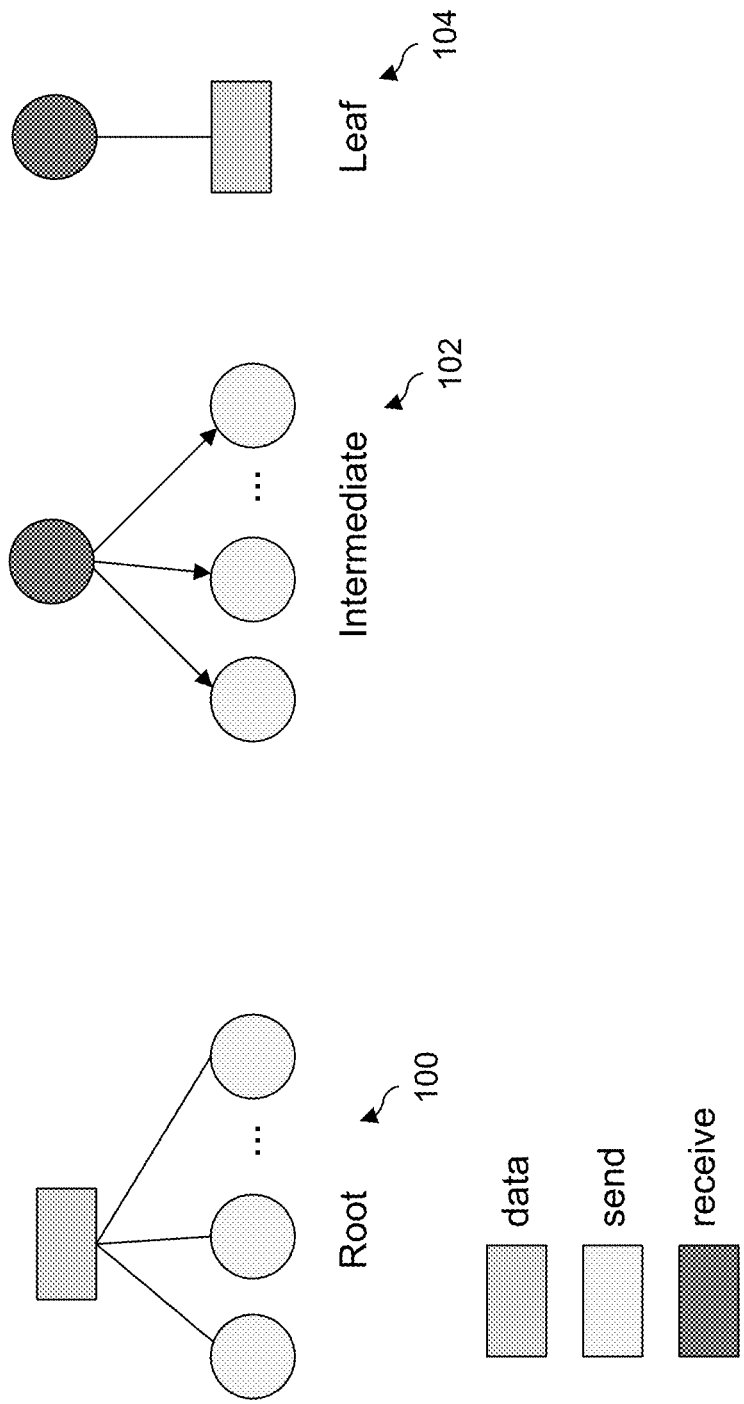
FIG. 1 is a diagram illustrating Directed Acyclic Graphs for a root, intermediate node and leaf nodes and showing the dependences and ordering of different operations in a Broadcast collective.

Embodiments of algorithms for optimizing small message collectives with hardware supported triggered operations and associated methods, apparatus, and systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

According to a study on the characterization of MPI usage on a production supercomputer, small message (≤256 bytes) MPI_Allreduce operations are, by far, one of the most heavily used MPI collectives in scientific applications, in terms of both the number of times it is called and the total amount of time spent in it. Therefore, it is important to optimize small message collectives. This disclosure provides a novel technique to optimize the small message collectives with hardware supported triggered operations. In one aspect, the technique eliminates the setup overhead incurred when using triggered op-based collectives by taking advantage of the fact that small message collectives are called repeatedly.

Network cards that support the Portals API based on triggered operations and counters support hardware offload of an operation to execute in the future when a trigger counter reaches a triggering threshold. With this mechanism, it is possible to create a chain of dependent operations, so that the execution of an operation is triggered when all the operations it depends on have completed its execution. Triggered operations can be used to offload the execution of collective operations to the hardware of the network card because collectives can be written as a dependency graph of (triggered) operations, where the dependences among the operations express when an operation o can be triggered based on the completion of the operations o depends on. Thus, triggered operations allow for the overlap of the execution of the collective operations with computation, without requiring the intervention of the processor (Central Processing Unit or 'CPU') to progress the execution of the collective operations.

Collective operations are usually implemented on top of point-to-point (P2P) messages or of one-sided communication. When collectives are implemented with P2P messages, the network card uses an eager or a rendezvous protocol, depending on the size of the message. The rendezvous protocol is used when sending large messages and requires a synchronization between the sender and the receiver. This synchronization is used to guarantee that the receiver has already posted the memory buffer where the message needs to be delivered. The eager protocol is used for small messages and does not require a synchronization between the sender and the receiver. With the eager protocol, if the message arrives and the receiver process has already posted the corresponding receive (expected message), the data is directly copied to the buffer specified by the receive operation. However, if when the message arrives, the receiver has not yet posted the corresponding receive (unexpected message), the unexpected message is copied to a shadow area and the matching bits needed to retrieve the message are saved in an overflow list. When the receiver process finally posts the receive operation, the message is copied from the shadow buffer to the memory buffer specified by the receive.

Collective operations can also be implemented using one-sided operations where a process puts/gets data to/from another process memory location. An implementation of a collective using one-sided communication incurs a similar synchronization to that of the rendezvous protocol, as a process performing a put/get operation to/from another process memory location needs to know that the memory location is ready before the put/get operation can proceed. The synchronization operation for the P2P rendezvous or the one-sided protocols usually involves the send of two control messages (without data) between each pair of processes: one is a request to send/put/get the data and the another is the reply that acknowledges that the memory buffer on the target process is ready.

An implementation of a collective operation based on the Portals API for triggered operations requires that once a collective has started, there is no further CPU intervention to complete the collective. However, when using P2P messages, if an unexpected message arrives to the receiver process, the copy from the shadow buffer to the user-specified buffer is not directly supported by the Portals API. Thus, collectives implemented with triggered operation need to utilize protocols that guarantee that there are not unexpected messages, so that CPU intervention is not required. Unfortunately, while it is possible to implement collectives using triggered operations with P2P messages with the rendezvous protocol (or similar one) or with one-sided communication to avoid unexpected messages, the synchronization overhead that these approaches require can significantly increase the execution time of the collective operations of small messages, which typically can be implemented in software with P2P messages and the eager protocol that do not require synchronization. Thus, when compared to software-based collectives, small message collectives are likely to only execute faster with hardware-support of triggered operations if we can find a mechanism without the synchronization overhead and that guarantees that there are not unexpected messages.

In this disclosure, we propose a novel algorithm that provides support for collective operations of small messages using triggered operations with a protocol similar to that used by the eager protocol, but that guarantees that unexpected messages do not occur. Our proposal removes the synchronization between the sender and the receiver from the critical path, providing low latency for collective operations using small messages. The proposed algorithm pre-post buffers to hold eager-sized messages. Control messages are sent out of the critical path to indicate when these buffers are available so that another collective can re-use them.

In accordance with aspects of the embodiments described herein, an algorithm to implement collective operations using triggered operations that eliminates the synchronization overhead of the P2P rendezvous or one-sided protocol and the unexpected messages of the eager protocol is provided. The mechanism efficiently supports collective operations with small messages.

The API for triggered operations provides a mechanism that enables an application to schedule an operation to execute when a trigger counter reaches a triggering threshold. In addition, upon completion of an operation, the value of a completion counter is incremented by one. This process results in a chain of events that allows the execution of a schedule of operations without the host intervention, which is free to perform other computations. Collective algorithms can be written as a dependency graph or Directed Acyclic Graph (DAG) of (triggered) operations, where the dependences among the operations express when an operation o can be triggered based on the completion of the operations o depends on.

To avoid unexpected messages, under an embodiment of the algorithm the receivers process pre-posts memory buffers to hold eager-sized messages and sends control messages to the sender indicating when a buffer is available. On a steady state, these control messages are sent at the end of a collective, so that next time a collective is called, the synchronization overhead does not appear on the critical path of the collective operation.

The following describes an embodiment of the algorithm on top of one-sided communication, for an MPI_Bcast (Broadcast) collective operation. On a Bcast collective, a root sends a message to all the other MPI ranks in the communicator. Ranks are assigned to the nodes of a tree, where there are three different types of nodes: 1) the root of the Bcast that sends data to its children, 2) the intermediate nodes, that receive the message from a parent node and send the message to their children, 3) leaf nodes that only receive the message from their parent nodes. For the root, the terms root and root node are used interchangeably.

FIG. 1 shows a root DAG 100, an intermediate DAG 102, and a leaf DAG 104. The DAGs in FIG. 1 show the dependences and ordering of different operations in a Broadcast collective. Generally, an implementation will have one or more layers of intermediate nodes, with the last intermediate nodes (in the tree structure) connected to leaf nodes. Note this does not imply the leaf nodes are all in the same layer, as some branch paths may employ more intermediate nodes than other branch paths. For simplicity, the following examples employ a single intermediate node layer. However, the algorithm may be extended to support multiple layers of intermediate nodes.

Figure 2:
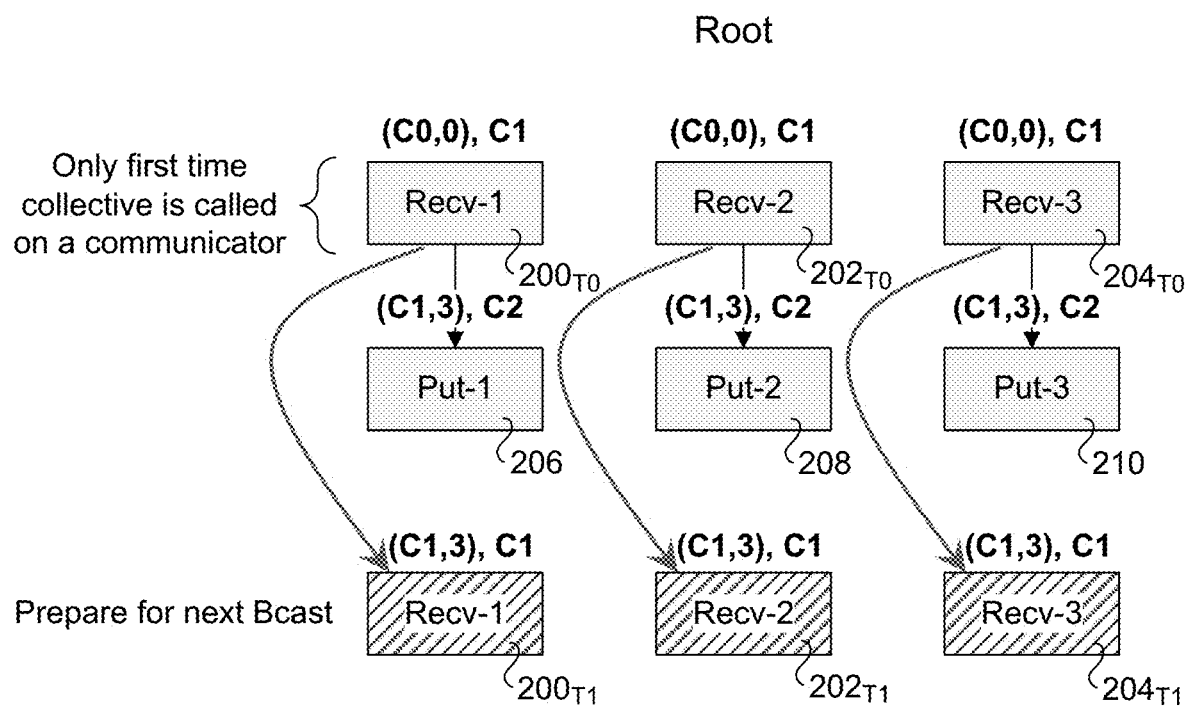
FIG. 2 is a diagram illustrating receives and put operations for a root, according to one embodiment.
Figure 3:
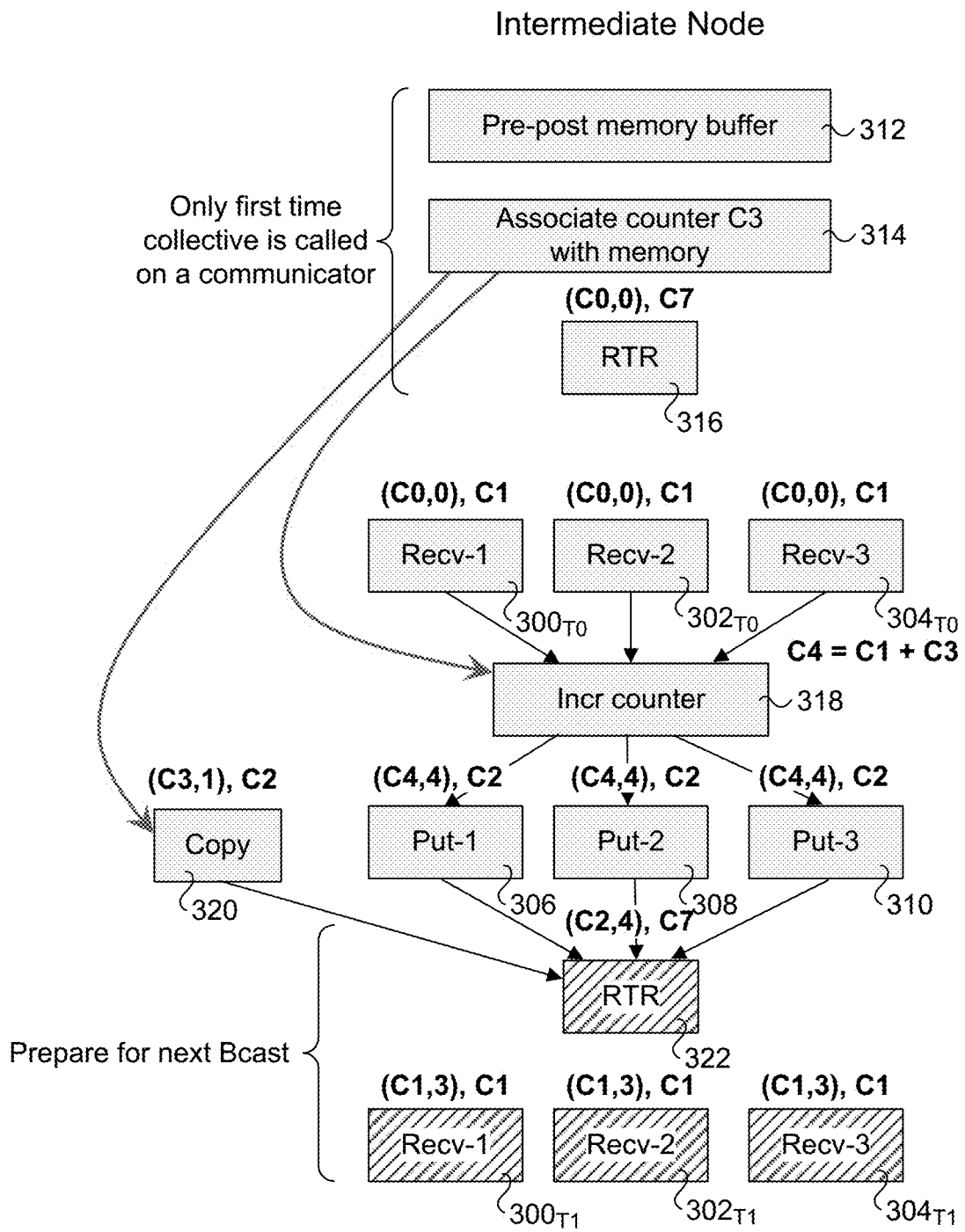
FIG. 3 is a diagram illustrating receives, put operations, and other structures and logic implemented by an intermediate node, according to one embodiment.

FIGS. 2 and 3 respectively show the operations of the algorithm for the root and an intermediate node in the tree. Each operation has a label of the form: [(C0, 0), C1], where C0 indicates the trigger counter and 0 is the threshold to trigger the operation; C1 is the completion counter, which increments by one when the operation completes. For simplicity, FIGS. 2 and 3 show the value of the trigger the first time the collective is executed.

The algorithm proceeds as follows. The first time that a collective is called on a communicator, a tree is created. Each rank determines its location in the tree and whether it is a root, an intermediate node, or a leaf node. These rank determinations are made using conventional MPI messaging using techniques known in the art. In this example, there are m=3 intermediate nodes, and n=3 leaf nodes. Intermediate and leaf nodes allocate one memory buffer and assign it a counter (C3 in FIG. 3) so that the counter is incremented every time data is written to it. Then, they send a Ready To Receive (RTR) message to their parent nodes.

The root of the Bcast( ) does not need to allocate memory, but upon entering the collective, it pre-posts m receives, where m is the number of children (m=3 in this example). As shown in FIG. 2, a root pre-posts a "receive" for each intermediate node (e.g., Recv-1, Recv-2, and Recv-3). During an initial state at time=T0, the three receives Recv-1, Recv-2, and Recv-3 are respectively labeled $200_{T0}$, $202_{T0}$, and $204_{T0}$.

A counter (C1) is attached to each of these receives. Each receive is matched with an RTR message from each child and the attached counter (C1) increments by one every time a receive is matched. When the counter (C1) reaches the value m, the root knows that all its children have allocated their memory. Then, this counter (C1 with threshold m=3) triggers a one-sided put operation to each child node that writes the data in the allocated buffer in the child node, as depicted by puts 206, 208 and 210. Following the put operations, the root prepares each of the receives for the next Bcast, while updating the associated counters. This is depicted in FIG. 2 as second state corresponding to time=T1, with the receives Recv-1, Recv-2, and Recv-3 now labeled $200_{T1}$, $202_{T1}$, and $204_{T1}$.

FIG. 3 shows the memory and counter structure of an intermediate node, according to one embodiment. The intermediate node includes a pre-post memory buffer 312 with a counter C3 314 associated with memory. When an intermediate node enters the Bcast, an RTR message 316 is sent to its parent rank to let it know that it is ready to receive the data. This message has a triggering counter C0, with initial threshold set to 0, and the completion counter is C7.

The intermediate node includes three receives Recv-1, Recv-2, and Recv-3 (since our example assumes that it has three children). The receives are labeled $300_{T0}$, $302_{T0}$, and $304_{T0}$ for the initial state (time=T0) and labeled $300_{T1}$, $302_{T1}$, and $304_{T1}$ for the second state (time=T1). It will be understood that the time T0 and T1 are representative of relative times for the intermediate node such that times T0 and T1 for the root and T0 and T1 for the intermediate nodes may or may not coincide.

Each of receives Recv-1, Recv-2, and Recv-3 is connected to an incremental counter operation 318 (that increments counter C4). As depicted by the figure, three puts 306, 308, and 310 depend on this counter C4. The execution of the RTR 322 depends on completion of the three puts and of the Copy Operation 320. When data is received by the intermediate node (via a put sent from the root) the data are copied into pre-post memory buffer 312 and counter C3 314 associated with the memory buffer 312 increases by one. This update of counter C3, triggers the Copy Operation 320.

As depicted, RTR 316 is used for the initial collective, while RTR 322 is used for subsequent collectives. The nomenclature (C2,4), C2 indicates the RTR threshold is 4: this represents copy 320+puts 306, 308, and 310.

Apart from allocating memory and sending an RTR message to its parent, an intermediate node performs the following actions:

First, the intermediate nodes pre-post n receives, where n is the number of children (e.g., leaf nodes in this example) and attach a counter to the receive operations. This is similar to what the root rank does (described above). As shown in FIG. 3 and discussed above, the intermediate node has n=3 receives Recv-1, Recv-2, and Recv-3 labeled $300_{T0}$, $302_{T0}$, and $304_{T0}$ for the initial state (time=T0). Notice in FIGS. 2 and 3 the C1 counters have a trigger threshold of zero, meaning that the receives do not have any dependence and can be posted immediately.

Second, the intermediate node sends the data with a put operation to its children, as depicted by puts 306, 308, and 310. This is done when two conditions are met: a) the data from the parent has been received; and b) all RTRs from the children have been received. Counter C4 with a threshold of 4 is used to trigger the put operation (three children+one write (copy) to the memory buffer). Counter C4 contains the sum of counter C3 (counter associated with the memory) and C1 (counter associated with matching the receive operations).

Third, the intermediate node copies the data from pre-post memory buffer 312 to the user specified buffer 320. An update to memory increments counter C3 and triggers a data copy. A completion counter (C2) is incremented after the copy completes.

Fourth, the intermediate node releases the buffer so that the parent can send additional data. After the Copy operation 320 and the puts 306, 308, and 310 have been completed, the data in the buffer is no longer needed and the buffer can be re-used for other collectives. Thus, at this point, the intermediate node sends back an RTR message to the parent node indicating that the buffer is free. The send of the RTR message is triggered by a counter (C2 with threshold 4, three puts to three children have completed and the data has been copied to the user buffer).

Before finishing the collective, the root and the intermediate nodes respectively post m and n receives, as depicted by receives $200_{T1}$, $202_{T1}$, and $204_{T1}$ in FIG. 2 and receives $300_{T1}$, $302_{T1}$, and $304_{T1}$ in FIG. 3. For the intermediate node, each receive is matched with the RTR message 322 that each child rank sends to its parent before exiting the collective. This way each child node notifies its parent that the buffer is free for the next collective. This removes the synchronization between parent and child from the critical path of the collective (when the node enters a collective).

Notice that in a P2P message using the rendezvous protocol, a Ready To Send message is sent before the data are sent to the destination. When the receiver is ready to receive the message, it performs a get operation from the sender buffer into the receiver buffer. This avoids the data copy that our algorithm requires, but it adds a roundtrip for each level of the tree. The number of levels of the tree is $\log_B N$, where N is the number of nodes and B is the branching factor of the tree. For large systems, the number of levels can be 10 or larger and the roundtrip latency can be 1 to 1.5 μseconds, depending on the number of switches the message needs to traverse. Thus, the rendezvous protocol can add at least 15 μseconds=10*1.5 to the time of the collective. This time cannot be hidden as it appears on the critical path of the collective. Given that the time to send a small message (16 (B)ytes) is about 1 second, this is a significant overhead.

Figure 4:
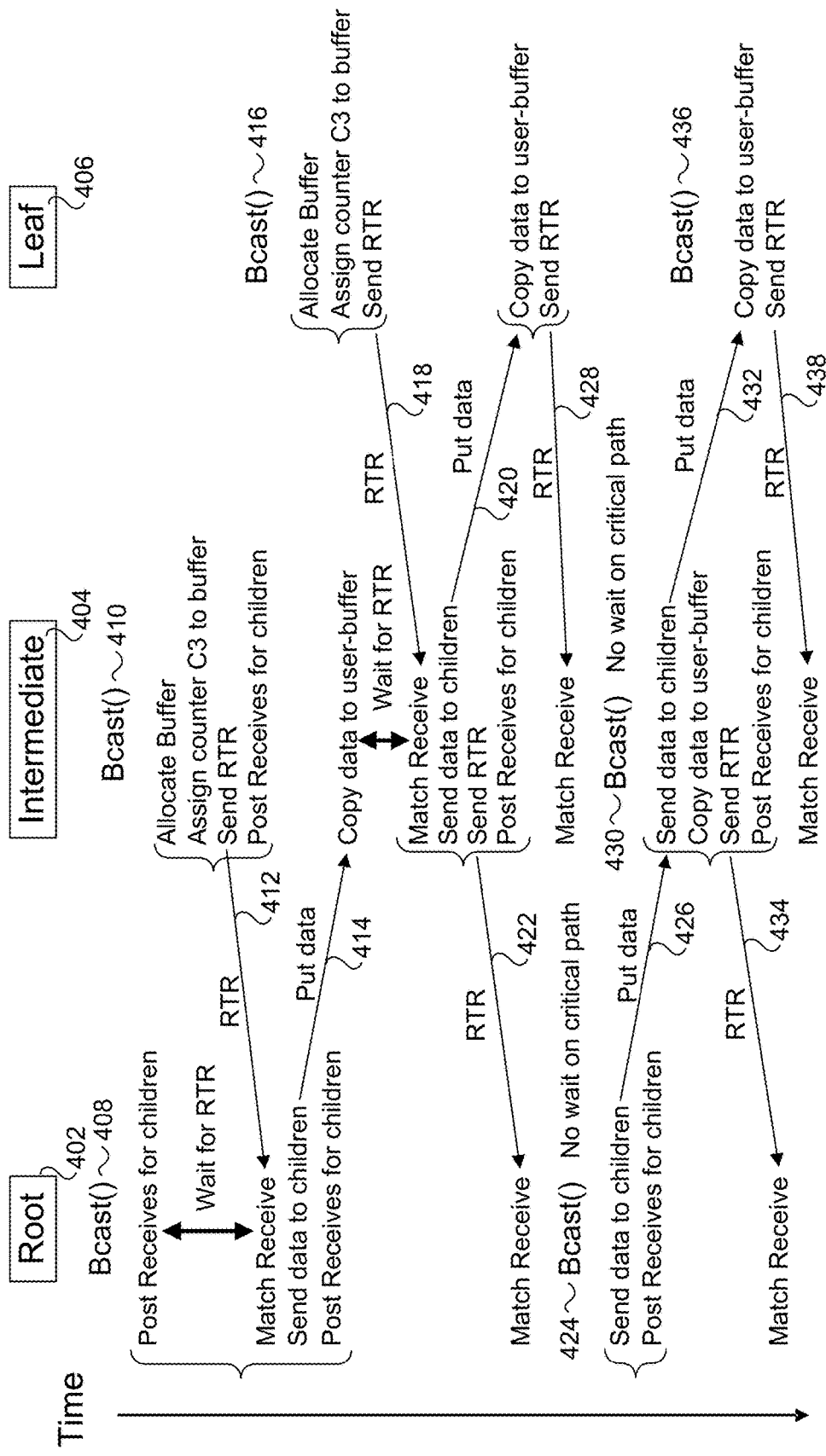
FIG. 4 is a message flow and timeline diagram illustrating the operations performed by a root, intermediate nodes, and leaf nodes under one embodiment of the algorithm.

FIG. 4 shows a message flow and timeline diagram 400 illustrating the operations performed by a root 402, intermediate node 404, and leaf node 406 under one embodiment of the algorithm. As shown in FIG. 4, the first time a collective (Bcast( )) is called on a communicator, root 402 and the intermediate nodes 404 may not be able to send the data to their children, as they need to wait to receive their RTR message. However, on a steady state, each child sends the RTR message at the end of the collective and the parent posts the corresponding receive also at the end of the collective. Thus, next time a collective is called on that communicator, the root can send the data to its children. Similarly, the intermediate node, can send the data as soon as it receives it from its parent. This removes the synchronization overhead from the critical path and avoids unexpected messages. Notice that the RTR messages could end up being unexpected if they arrive before the parent rank has posted the corresponding receives. These RTR messages are simply control messages that do not contain data, so an unexpected RTR message is not a problem, as no data needs to be copied.

In further detail, in connection with a collective Bcast( ) 408 root 402 posts receives for each of its children (i.e., each intermediate node 404). It then waits for an RTR 412 from each intermediate node 404, where upon receipt of an RTR it performs a match receive. The match receive is used to count the RTRs until the count reaches the threshold (i.e., the number of child intermediate nodes), which indicates an RTR has been received from each child intermediate node. Following the match receive, root 402 sends data to each of its children, as depicted by put data 414 sent to intermediate node 404. Root 402 then post receives for each child to prepare for the next Bcast( ).

In parallel, each intermediate node 404 performs a collective Bcast( ) 410. As discussed above in FIG. 3, this includes allocating a buffer and assigning a counter C3 to the buffer. Each intermediate node 404 then sends an RTR 412 to root 402 to inform the root it is ready to receive data. Each intermediate node 404 then posts receives for each of its children (i.e., each leaf node 406).

Also in parallel, each leaf node performs a collective Bcast( ) 416. This includes allocating a buffer and assigning a counter C3 to the buffer, followed by sending an RTR 418 to the parent intermediate node 404 for each leaf node.

Put data 414 is received by each intermediate node 404 and copied into the user-buffer allocated by the node. Each intermediate node 404 then waits for an RTR 418 from each of its child leaf nodes 406. Each intermediate node 404 performs a match receive, updating the match count until a threshold is reached indicating an RTR has been received from each child leaf node. When the threshold for the match receive is reached (and the data has been received from the parent node), each intermediate node 404 sends data to each of its child leaf nodes 406, as depicted by put data 420. Each intermediate node 404 also sends an RTR 422 to root 402 to inform the root it is ready to receive, and posts receives for each of its child leaf node 406.

Upon receipt of RTR 422 from the intermediate nodes, root 402 performs a match receive in the same manner as before. Then, when the root performs a second collective Bcast( ) 424, the difference between this Bcast( ) 424 and the initial Bcast( ) 408 is that there is no waiting on the critical path: the RTRs from the intermediate child nodes have already been received. In connection with Bcast( ) 424 root 402 sends data to each of its child intermediate nodes 404, as depicted by put data 426, and post receives for each of these children to prepare for the next Bcast( ).

Upon receipt of put data 420, each leaf node 406 copies the data to it user buffer and sends and RTR 428 to its parent intermediate node 404. Intermediate node 404 performs a match receive to match the number of RTR 428 with the number of child leaf nodes 406. When the intermediate node 404 performs a second Bcast( ) 430, the receives from the leaf nodes have already been received. Thus, as with Bcast( ) 424 for root 402, Bcast( ) 430 does not have to wait for any RTRs on the critical path.

In connection with Bcast( ) 430, upon receipt of put data 426, the intermediate node 404 sends the data to each of its child leaf nodes 406, as depicted by put data 432. It also copies data to its user-buffer, sends an RTR 434 to root 402 and posts receives for each of its children. In parallel, each leaf node 406 performs a Bcast( ) 436 for which put data 423 is copied to its user-buffer and an RTR 438 is sent to each leaf node's parent intermediate node 404.

At this point, the sequence of operations for each of root 402, intermediate nodes 404, and leaf nodes 406 are repeated on an ongoing basis using the same pattern for the Bcast( ) 424, 430, and 436, respectively. Significantly, after the initial Bcast( ) 408 and 410 there is no waiting on the critical path for root 402 and intermediate nodes 404.

The proposed algorithm can be further improved by allocating more than one buffer. This can help in case of imbalance or when implementing a collective with medium size messages that use message pipelining (where a message is chunked into pieces so that the send of a chunk can be overlapped with the reception of another one). The proposed algorithm requires a data copy, but since the messages are small, the copy overhead should be small. Also, the copy can be performed after the message has been sent to the other children, so that the copy time does not appear in the critical path of the collective.

Notice, that while this example explains the implementation of a broadcast operation, other collective operations can be implemented using a similar idea as the one described here.

Performance projections show that triggered operations can provide higher performance than software-based implementations. With the proposed algorithm, triggered operations are an efficient solution even for collective operations of small messages.

Figure 5:
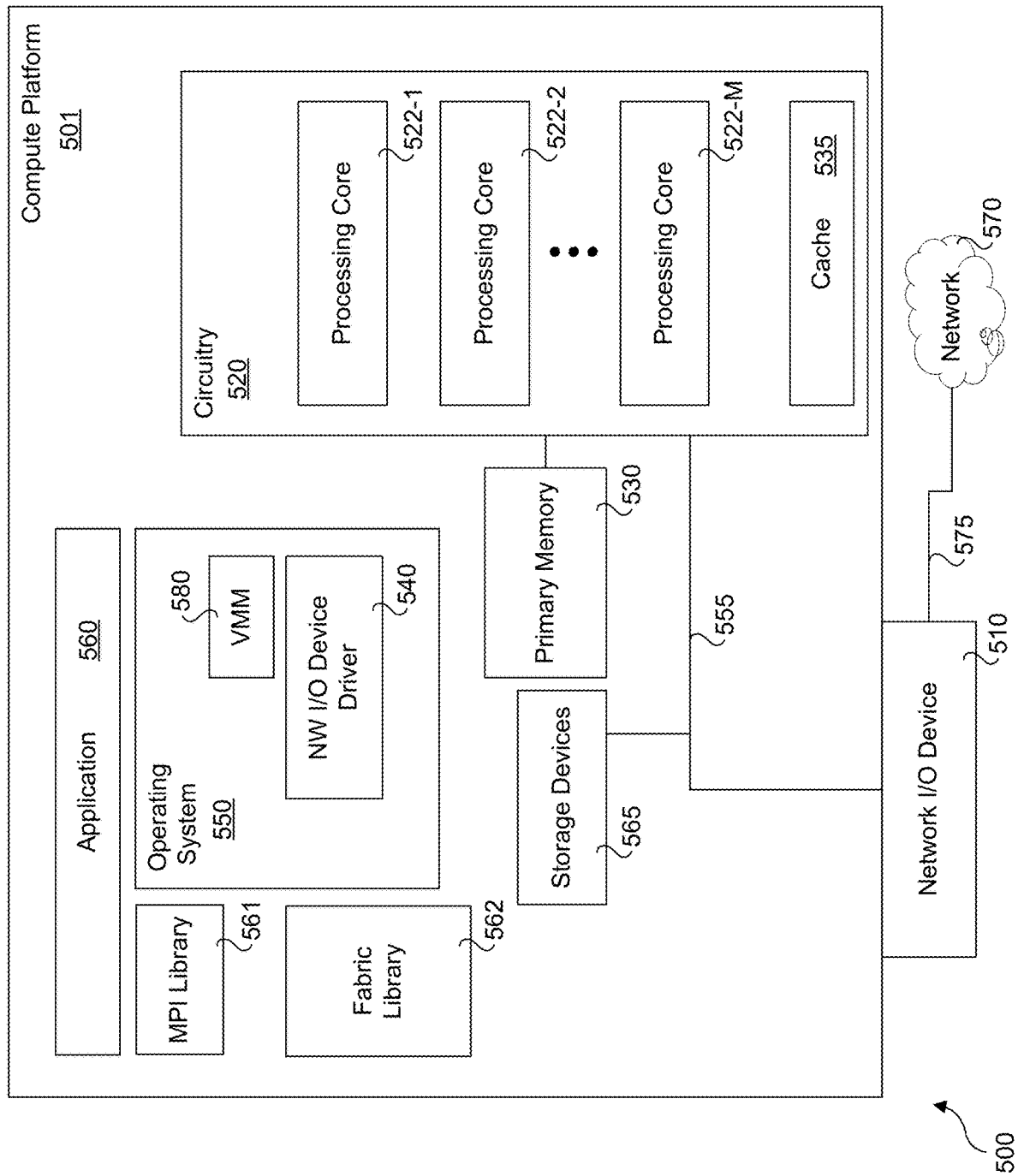
FIG. 5 is a schematic block diagram of a compute platform, according to one embodiment.

FIG. 5 illustrates an example computing system 500 on which aspects of embodiments described herein may be implemented. As shown in FIG. 5, computing system 500 includes a compute platform 501 coupled to a network 570 (which may be the Internet, for example, or a network within a data center). In some examples, as shown in FIG. 5, compute platform 501 is coupled to network 570 via network communication link 575 and through at least one network I/O device 510 (e.g., a NIC or HFI) having one or more ports connected or coupled to network communication link 575. In an embodiment, network I/O device 510 is an Ethernet NIC. Network I/O device 510 transmits data packets from compute platform 501 over network 570 to other destinations and receives data packets from other destinations for forwarding to compute platform 501.

According to some examples, compute platform 501 includes circuitry 520, primary memory 530, network (NW) I/O device driver 540, operating system (OS) 550, virtual machine manager (VMM) 580 (also known as a hypervisor), at least one application 560, MPI library 561, fabric library 562 (which includes MPI library 561 in one embodiment), and one or more storage devices 565. In one embodiment, OS 550 is Linux™. In another embodiment, OS 150 is a Windows® Server OS. In an embodiment, application 560 represents one or more application programs executed by circuitry 520. Network I/O device driver 540 operates to initialize and manage I/O requests performed by network I/O device 510. In an embodiment, packets and/or packet metadata transmitted to network I/O device 510 and/or received from network I/O device 510 are stored in one or more of primary memory 530 and/or storage devices 565. Generally, storage devices 565 may be one or more of hard disk drives (HDDs), solid-state drives (SSDs), and/or non-volatile memories (NVMs) such as NVDIMMs. In some embodiments, circuitry 520 may communicatively couple to network I/O device 510 via a communications link 555. In one embodiment, communications link 555 is a Peripheral Component Interface Express (PCIe) bus conforming to revision 4.0 or other versions of the PCIe standard. In some examples, operating system 550, NW I/O device driver 540, application 560, VMM 580, MPI library 561, and fabric library 562 are implemented, at least in part, via cooperation between one or more memory devices included in primary memory 530 (e.g., volatile or non-volatile memory devices), storage devices 565, and elements of circuitry 520 such as processing cores 522-1 to 522-M, where M is an integer of two or more. In an embodiment, OS 550, NW I/O device driver 540, VMM 580, application 560, MPI library 561, and fabric library 562 are executed by one or more processing cores 522-1 to 522-M. In other embodiments, there are other endpoint devices coupled to communications link 555 (e.g., PCIe interconnect).

In some examples, compute platform 501, includes but is not limited to a computer server, a HPC server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. In one example, compute platform 501 is a disaggregated server. A disaggregated server is a server that breaks up components and resources into subsystems. Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 520 having processing cores 522-1 to 522-$m$ may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 520 may include at least one cache 535 to store data. In some embodiments cache 535 represents local Level 1 and Level 2 (L1 and L2) caches (for each processor core) and an L3 or Last Level Cache (LLC).

According to some examples, primary memory 530 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 530 may include one or more hard disk drives within and/or accessible by compute platform 501.

In an embodiment, fabric library 562 provides an API for one or more application(s) 560 to interface directly with network I/O device 510. Application 560 may call one or more functions provided by fabric library 562 to implement collective communications in compute platform 501. Fabric library 562, in at least one embodiment, communicates with network I/O device 510 to manage collective communications operations. In an embodiment, application 560 uses fabric library 562 to manage storage in application space used for collective communications and to assign hardware counters (e.g., trigger counters and completion counters) in network I/O device 510. MPI library 561 provides APIs for MPI functions.

In an embodiment, network I/O device 510 includes a hardware implementation of triggered operations (TOs), trigger counters, and completion counters. TOs allow application 560 to queue a data transfer request that is deferred until at least one specified condition is met. A typical use is to send a message only after receiving all input data. TOs are a means of expressing an ordered series of communication and atomic operations to network I/O device 510 for asynchronous execution. Noise and jitter from OS 550 or application 560 are bypassed, resulting in faster data propagation than SW-based sending and receiving of the data between processes of compute platform 501. This offload of processing to network I/O device hardware 510 is a benefit particularly for non-blocking collectives (e.g., machine learning applications will issue many non-blocking "MPI_Allreduce" collective operations simultaneously). Fabric library 562 provides a mechanism for application 560 to allocate storage for collective communications.

Figure 6:
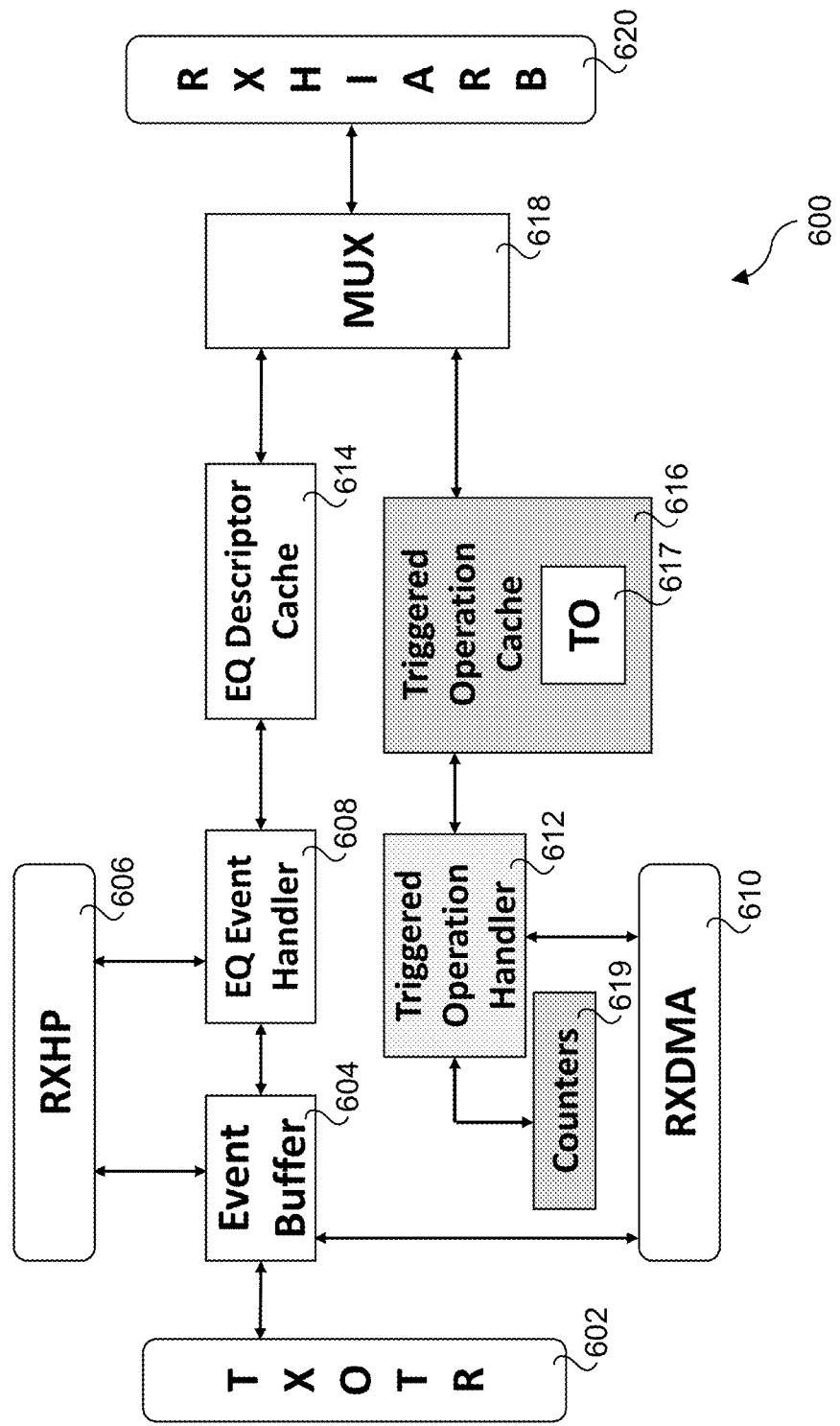
FIG. 6 is a diagram of a portion of an I/O device, according to one embodiment.

FIG. 6 illustrates a diagram of a portion of an I/O device 600 according to an embodiment. In an embodiment, I/O device 600 is a portion of network I/O device 510 configured to implement embodiments of the algorithm described above. Receive host interface arbitration (RxHIArb) 620 is an interface that allows event logic (including event buffer 604, event queue (EQ) event handler 608, and EQ descriptor cache 614) to access host memory (e.g., primary memory 530). RxHIArb 620 is coupled with EQ descriptor cache 614 and a triggered operation cache 616 with 1K entries via multiplexor (MUX) 618. From the perspective of triggered operations, a purpose of RxHIArb 620 is to load TOs 617 into triggered operations cache 616 on a miss or spill items out of triggered operations cache 616 on a capacity eviction. The receive header processing (RxHP) interface 606 connects the event logic to header processing logic (not shown). This enables the header processing logic to provide data about upcoming receive side events to the event logic. The transmit outstanding transactions and reliability (TxOTR) interface 602 is the analogous interface for transmit logic. The receive direct memory access (RxDMA) interface 610 provides information about message completion to the event logic. RxDMA 610 is the block that can determine when a receive side message has actually been written to host memory. RxDMA 610 then retrieves events from the event logic to write to the host and also informs the event logic when counters are incremented.

Event buffer 604 is related to "full events". Event buffer 604 stores information that will be written into host memory when a message completes. Full events are not directly related to triggered operations. EQ event handler 608 manages pointers in the Event Queue (EQ) (which holds full events). EQ descriptor cache 614 holds the pointers (head and tail) for full event queues. EQ descriptor cache 614 also holds information such as the size of those queues and control bits that impact the behavior of those queues.

Triggered operation handler 612 accepts an updated counter from RxDMA 610 and walks the list of triggered operations 617 from triggered operation cache 616. When a triggered operation has a threshold that is met by the new count, the triggered operation is issued. In one embodiment, issuing that triggered operation means passing the triggered operation back to the RxDMA 610. RxDMA 610 has the appropriate interfaces to the transmit logic (not shown) and the receive logic (e.g., RxHP 606) to initiate new operations.

I/O device 600 includes a plurality of counters 619. Counters 619 include a plurality of trigger counters and a plurality of completion counters. The number of counters is fixed according to the design of the I/O device.

Some embodiments may advantageously utilize a Host Fabric Interface (HFI) hardware-based message scheduler in network I/O device 510 to improve or optimize collective operations for application 560. Any suitable hardware-based scheduler technology may be utilized for various embodiments. An example of suitable hardware-based scheduler technology may include technology compatible with the PORTALS Network Programming Interface specification (e.g., version 4.2, released November 2018). For example, some embodiments may utilize a combination of an online messaging profile-based optimization technology and a hardware scheduler's triggered operations (e.g., exposed via an industry standard interface such as OpenFabrics Interface (OFI) developed by the Open Fabrics Alliance). Advantageously, in some embodiments no software agent may be needed, thereby freeing all processors for computation purposes. Additionally, some embodiments may issue messages exactly in the priority order desired, and there is no need to recall any message, thereby decreasing communication latency for applications.

Generally, communication operations are scheduled to be executed by the HFI immediately upon submission by the application. Triggered communication operations allow the application to specify when the operation should be scheduled to execute based on a condition being met, for example, a trigger counter meeting or exceeding a specified threshold value. In an example of a basic technology for a triggered operation, when the value of a trigger counter reaches the specified threshold value, the operation executes. Upon completion of the operation, a separate completion counter may be incremented (e.g., if specified by the application). Triggered operations may be implemented in the HFI by a hardware-based scheduler. An API to access the triggered operations may be exposed via the OFI. Non-limiting examples of triggerable operations include Put (e.g., write), Get (e.g., read), Send, Receive, Atomic, and Counter Increment operations. The triggerable counter increment operation may allow incrementing a counter if another counter is incremented. Such linked counter operation may be particularly useful to allow an application to link multiple disjoint chains of triggered operations.

A triggered operation (TO) (e.g., a deferred data transfer request, triggered counter increment), initially stored in application space in primary memory 530 or storage devices 565 on compute platform 501, includes a communication operation, a triggering counter, and a threshold. A TO is pushed to network I/O device 510 when fabric library 562 adds the TO to the list of pending triggered operations. Network I/O device 510 stores the TO in triggered operation 616 cache and links the TO into an allocated list (described below). Other approaches are possible. In an embodiment, fabric library 562 could write the TO into primary memory 530 and then tell network I/O device 510 to add the TO to the allocated list without pushing the contents of the TO. In an embodiment, the push option is used to further the goal of having the TO cache "never miss". Thus, as long as the TO cache does not run out of capacity, the push approach is better. Unfortunately, multiple user level processes are typically concurrently using the network I/O device in a somewhat uncoordinated way; thus, it is hard for one process to know that another process has already mostly filled the cache (for example).

Counters have a single integer value and are incremented when communication events such as completion of a send operation or a receive operation occur. A TO 'fires' when its counter is equal to or greater than its threshold, initiating the communication operation of the TO by network I/O device 510. In turn, that communication operation upon completion may specify a counter to increment in another TO, which may cause more triggered operations to fire, and so on, forming a chain (or tree) of hardware-implemented triggered communication operations. Once initialized, triggered operations are managed by network I/O device 510, which checks for their threshold condition and fires them asynchronously without software involvement (e.g., without control by application 560 or fabric library 562).

The communication operations offloaded to the Host Fabric Interface (HFI) by an application are, in general, executed immediately. Triggered operations allow the application to specify when the operations should be executed or triggered by using a trigger counter along with a triggering threshold. In order to exploit hardware offloading, each operation in a collective requires two counters: trigger and completion. When the value of the trigger counter reaches the specified threshold, the operation is triggered for execution. In addition, the value of the completion counter is increased by one once the operation is complete.

Generally, embodiments of the algorithms disclosed herein may be implemented in distributed compute environments under which compute platforms are communicatively coupled via one or more networks, via direct peer-to-peer interconnects or links, or a combination of these approaches. As described above, the algorithms are implemented in hardware in communication interfaces such as NICs and HFIs. As used herein, including the claims, a communication interface comprises any type of I/O device used for communication with other like I/O devices. For example, in distributed environments the compute platforms a communicatively coupled via one or more networks, and the communication interfaces are configured to support network-based communications, such as network adaptors, network interfaces, NICs, etc. A communication interface may also comprise an HFI or other fabric interface. Generally, the fabric may or not employ a switched-based architecture such that in some HPC deployments the compute platforms, which also may be referred to as compute nodes, are interconnected via direct peer-to-peer links. Other fabrics may employ switches. In addition to physical links such as wired and optical cables, compute nodes may be coupled via wired interconnects implemented in backplanes or midplanes or the like.

Figure 7:
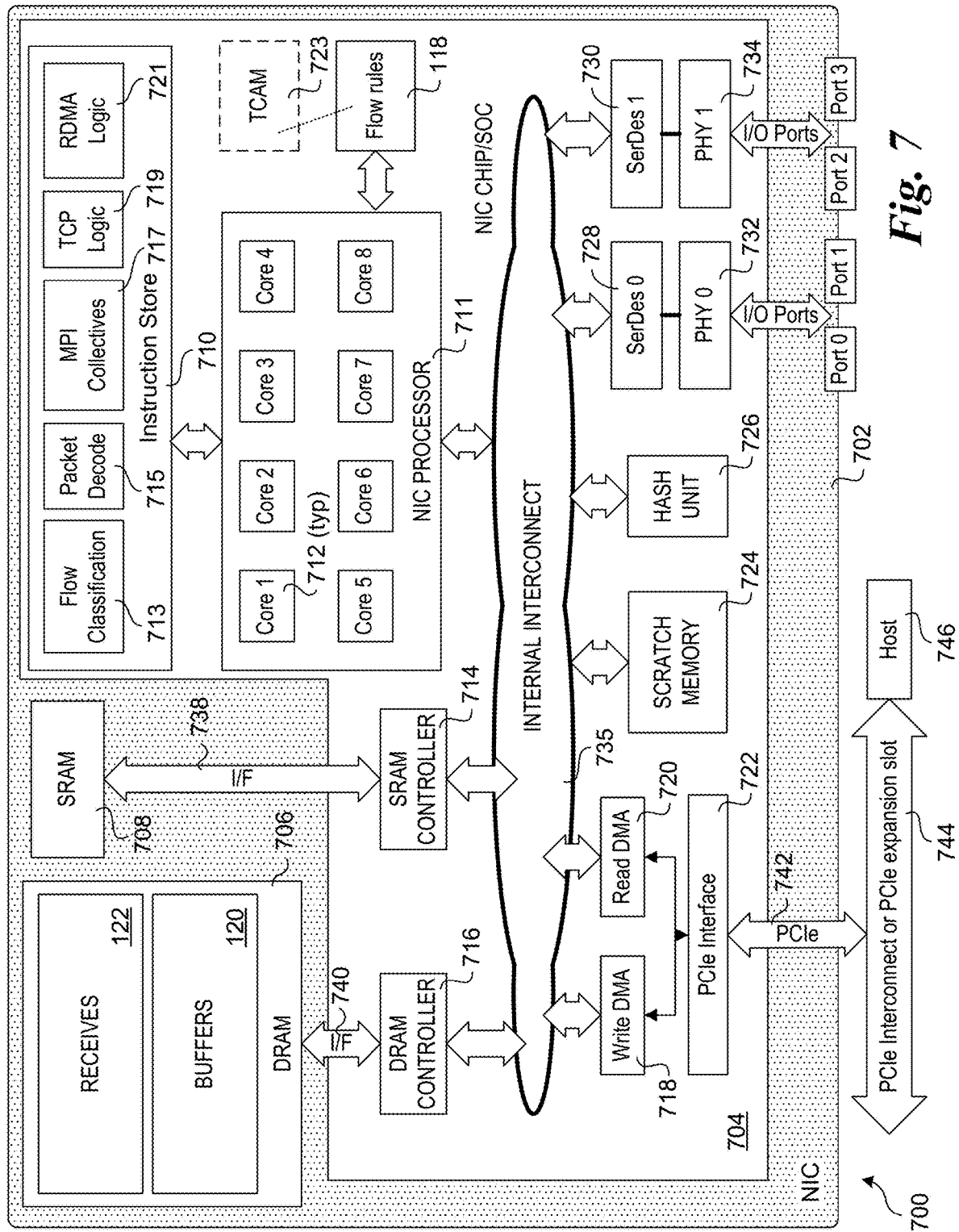
FIG. 7 is a schematic diagram of a NIC, according to one embodiment.

In some embodiments, the communication interfaces are NICs. An exemplary system architecture for a NIC 700 is shown in FIG. 7. NIC 700 includes a NIC system board 702 on which a NIC Chip/SoC 704, Dynamic Random Access Memory (DRAM) 706 and Static Random Access Memory (SRAM) 708 are mounted. Under various embodiments. NIC system board 702 is representative of an Ethernet controller card, a daughter board, a multi-chip module board or substrate, or it may be part of a computer system board, such as a main board or motherboard for a computer server. NIC Chip/SoC 704 is representative of Ethernet processing and/or control unit, and may be embodied in various forms, including as an Ethernet controller chip or a network processor unit (NPU).

In the illustrated embodiment, NIC Chip/SoC 704 includes an instruction store 710, a NIC processor 711 including multiple cores 712, an SRAM controller 714, a DRAM controller 716, a Write DMA block 718, a Read DMA block 720, a PCIe interface 722, an optional TCAM (ternary content-addressable memory) 723, a scratch memory 724, a hash unit 726, Serializer/Deserializers (SerDes) 728 and 730, and PHY interfaces 732 and 734. Each of the components is interconnected to one or more other components via applicable interconnect structure and logic that is collectively depicted as an internal interconnect cloud 735.

Instruction store 710 includes various instructions that are executed by cores 712, including Flow Classification instructions 713, Packet Decode instructions 715, MPI collectives 717, TCP logic instructions 719, and RDMA logic instructions 721. Under one embodiment, various packet processing operations are performed using a pipelined architecture. As an alternative, the combination of cores 712 and instruction store 710 may be implemented using embedded programmable logic, such as via a Field Programmable Gate Arrays (FPGA) or the like (not shown).

In one embodiment, instruction store 710 is implemented as an on-chip store, such as depicted in FIG. 7. Optionally, a portion or all of the instructions depicted in instruction store 710 may be stored in SRAM 708 and accessed using SRAM controller 714 via an interface 738. SRAM 708 may also be used for storing selected data and/or instructions relating to packet processing operations and instructions for implementing the algorithms described herein.

Memory in DRAM 706 is used for receives 122 and buffers 120 and is accessed using DRAM controller 716 via an interface 740. DRAM 706 may also be used for conventional packet handling operations, such as send queues/buffers and receive queues/buffers, which are not shown for simplicity. Write DMA block 718 and Read DMA block 720 are respectively configured to support DMA Write and Read operations to support DMA operations between buffers 120 and host memory (e.g., primary memory 530 for compute platform 501). In the illustrated embodiment, DMA communication between DRAM 706 and a platform host circuitry is facilitated over PCIe interface 722 via a PCIe link 742 coupled to a PCIe interconnect or PCIe expansion slot 744, enabling DMA Write and Read transfers between DRAM 706 and system or host memory for a host 746 using the PCIe protocol.

In addition to PCIe, other interconnect technologies and protocols may be used. For example, these include but are not limited to Computer Express Link (CXL), InfiniBand, and Omni-Path.

Scratch memory 724 and hash unit 726 are illustrative of components employed by NICs for facilitating scratch memory and hashing operations relating to packet processing. For example, as described above a hash operation may be implemented for deriving flow IDs and for packet identification. In addition, a hash unit may be configured to support crypto-accelerator operations.

PHYs 732 and 734 facilitate Physical layer operations for the NIC, and operate as a bridge between the digital domain employed by the NIC logic and components and the analog domain employed for transmitting data via electrical, optical or wired signals. For example, in the illustrated embodiment of FIG. 7, each of PHYs 732 and 734 is coupled to a pair of I/O ports configured to send electrical signals over a wire or optical cable such as a high-speed Ethernet cable. Optical and wireless signal embodiments would employ additional circuitry and interfaces for facilitating connection via optical and wireless signals (not shown). In conjunction with PHY operations, SerDes 728 and 730 are used to serialize output packet streams and deserialize inbound packet streams.

Generally, a NIC may be configured to store routing data for facilitating packet identification and flow classification, including forwarding filters and rules either locally or using a memory-mapped IO (MMIO) address space in system or host memory. When stored locally, this routing data may be stored in either DRAM 706 or SRAM 708. Routing data stored in a MMIO address space may be accessed by NIC 700 via Read and Write DMA operations. Generally, setting up MMIO address space mapping may be facilitated by a NIC device driver in coordination with the operating system. The NIC device driver may also be configured to enable instructions in instruction store 710 to be updated via the operating system. Optionally, the instructions in instruction store may comprise firmware instructions that are stored in non-volatile memory, such as Flash memory, which may either be integrated on NIC Chip/SoC 704 or mounted to NIC system board 702 (not shown).

As an option to using DRAM 706 or SRAM 708, flow rules 118 may be implemented in hardware-based logic such as a FPGA or other programmable logic device coupled to NIC processor 711. Hash unit 726 may be implemented in the same hardware-based logic as that used for flow rules 118. Flow rules 118 may also be implemented using TCAM 723.

NIC processor 711 may employ any suitable processor architecture in current use or developed in the future. In one embodiment, the processor architecture is an Intel® x86 architecture, an IA-32 architecture or an IA-64 architecture. In one embodiment, the NIC processor architecture is an ARM®-based architecture.

Figure 8:
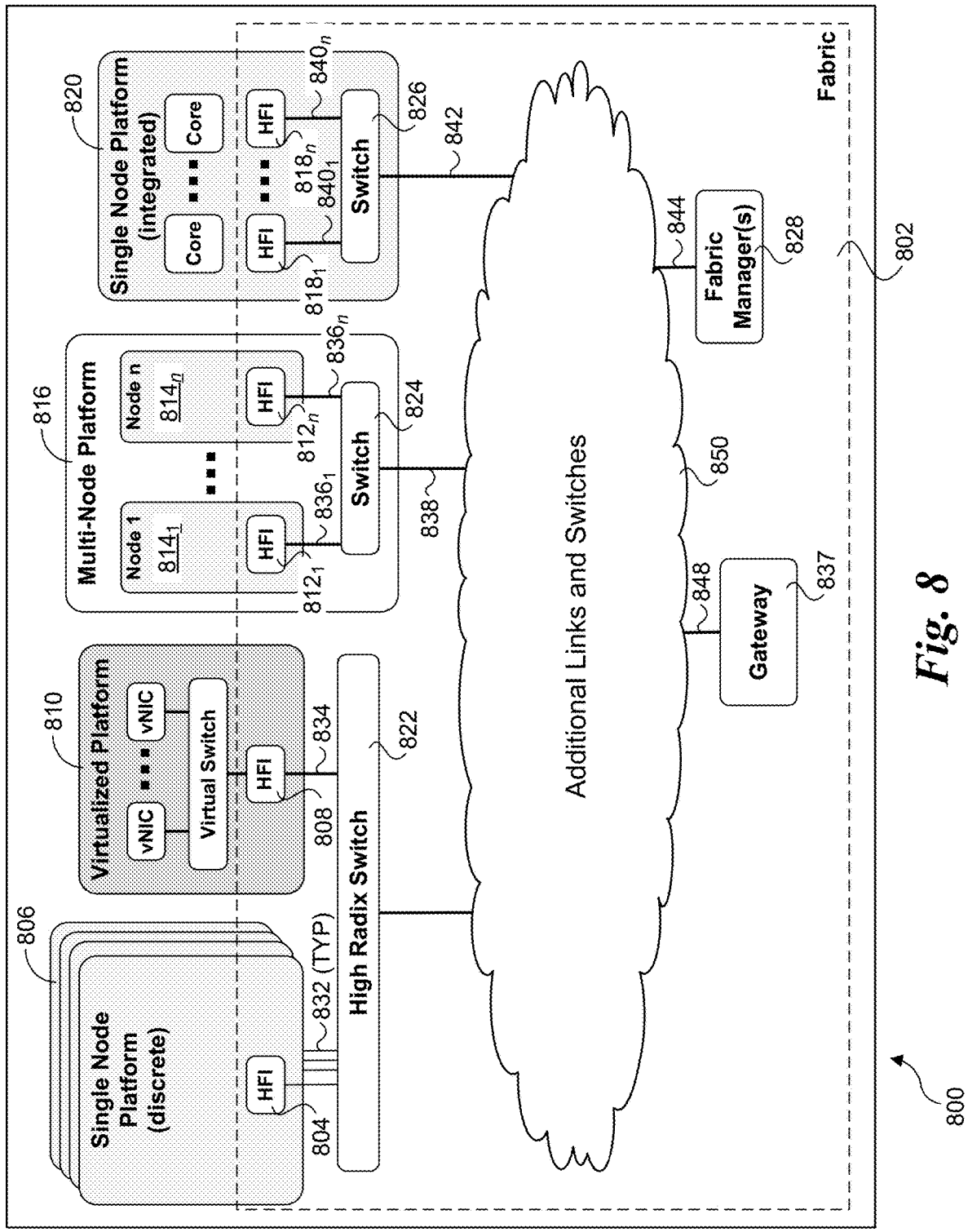
FIG. 8 is a schematic diagram illustrating a high-level view of a system comprising various components and interconnects of the fabric architecture, according to one embodiment.

FIG. 8 shows a high-level view of a system 800 illustrating various components and interconnects of a system architecture in which various configurations of compute nodes may be implemented, according to one embodiment. A central feature of the architecture is the fabric 802, which includes a collection of the HFIs and gateways interconnected via the architectures links and switches. As depicted in FIG. 8, the fabric 802 components includes multiple HFIs 804 (one is shown), each hosted by a respective discrete single node platform 806, an HFI 808 hosted by a virtual platform 810, HFIs $812_1$ and $812_n$ hosted by respective nodes $814_1$ and $814_n$ of a multi-node platform 816, and HFIs $818_1$ and $818_n$ of an integrated single node platform 820, a high radix switch 822, switches 824 and 826, fabric manager(s) 828, a gateway 837, links 832, 834, $836_1$, $836_n$, 838, $840_1$, $840_n$, 842, 844, 848, and additional links and switches collectively shown as a cloud 850.

In system 800, the various nodes may be used to host MPI processes and/or otherwise may be implemented to host processes for which communication is facilitated through use of the Portals network programming interface and associated API and libraries. In one embodiment, the processes executing on the nodes are MPI processes, which communication facilitated via use of a Portals-based implementation of the MPI libraries.

Generalized HPC Environments

Figure 9:
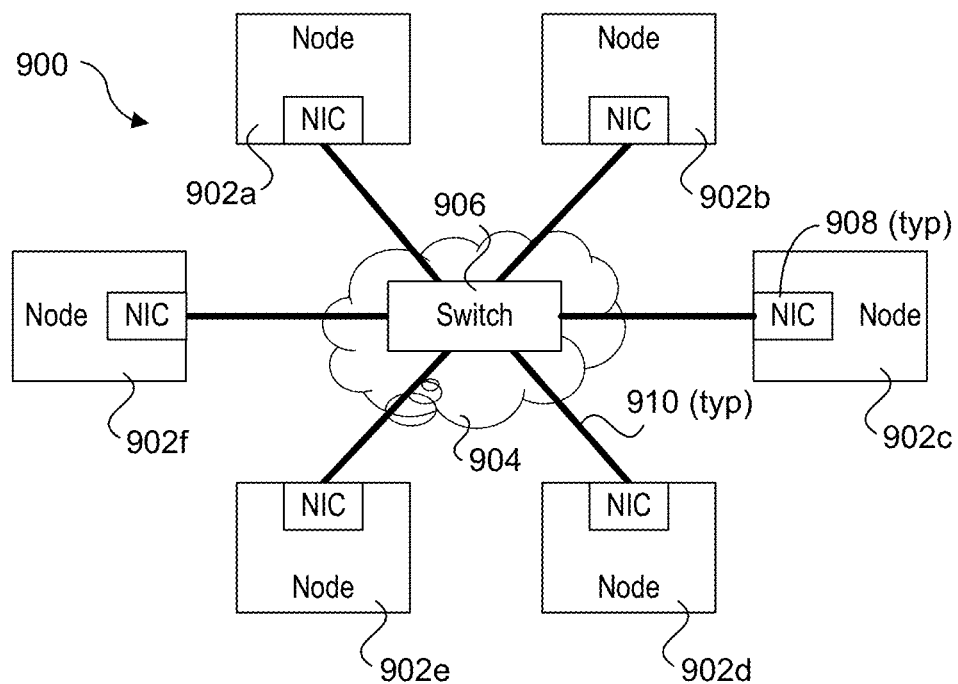
FIG. 9 is a schematic diagram of an exemplary HPC cluster communicatively coupled via a network or fabric.
Figure 10:
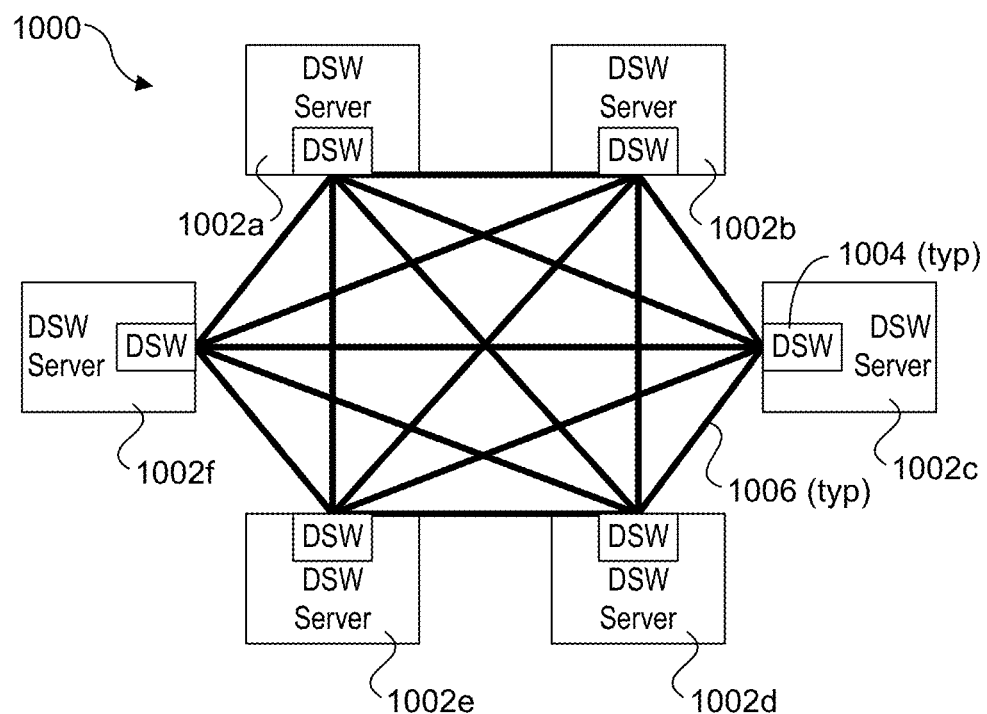
FIG. 10 is a schematic diagram of an exemplary HPC cluster of disaggregated switch (DSW) servers coupled via direct peer-to-peer links.

FIGS. 9 and 10 show examples of small HPC clusters 900 and 1000 illustrative of more generalized HPC environments in which the embodiments of the novel algorithms disclosed herein may be implemented. HPC cluster 900 is illustrative of a conventional network environment under which multiple nodes 902*a*, 902*b*, 902*c*, 902*d*, 902*e*, and 902*f* are coupled in communication over a network or fabric 904 including a switch 906. As further shown, each node 902 includes a NIC 908 that is coupled to switch 906 via a link 910. Generally, network 904 may employ various types of physical links and related protocols, including but not limited to Ethernet and InfiniBand. In the latter case, NICs 908 would be replaced with InfiniBand Host Control Adaptors (HCAs).

HPC cluster 1000 comprises a cluster of disaggregated switch (DSW) servers 1002*a*, 1002*b*, 1002*c*, 1002*d*, 1002*e*, and 1002*f* that include DSW interfaces 1004 that support direct peer-to-peer links 1006 without the need for a switch. In one embodiment, a cluster or array of DSW servers may be installed in a tray or drawer in a DSW rack, such as available under the INTEL® Rack Scale Design architecture.

Generally, the functionality provided by embodiments of NICs disclosed herein may be implemented via one or more forms of embedded logic. As used herein, including the claims, embedded logic comprises various forms of circuitry with or configured to implement logic including but not limited to processors, CPUs, microengines, microcontrollers, FPGAs and other programmable logic devices, ASICs (Application Specific integrated Circuits), Graphic Processing Units (GPUs), and various forms of accelerators, etc. The logic may be implemented by programming the physical hardware (e.g., for FPGAs and other programmable logic devices and ASICs) and/or via execution of instructions on one or more processing elements, such as a processor core, microengine, microcontroller, and processing elements in GPUs and accelerators. Hybrid devices may be implemented with more than one form of embedded logic, such as a NIC that includes a processing pipeline that is implemented via a combination of pre-programmed or dynamically programmed hardware circuitry and one or more processing elements on which firmware or embedded software are executed.

In addition to implementation in the collective algorithms described and illustrated in the foregoing embodiments, the teaching and principles disclosed herein may be used to optimize communication of small messages in general. For example, triggered operations may be used to minimize the latency of the communication of data in a Graphics Unit Accelerator (GPU) if the communication can be offloaded to the NIC through triggered operations.

In addition to nodes comprising processors, CPUs, and processor cores (physical and virtual cores), the teaching and principles disclosed herein may be applied to Other Processing Units (collectively termed XPUs) including one or more of Graphic Processor Units (GPUs) or General Purpose GPUs (GP-GPUs), Tensor Processing Unit (TPU) Data Processor Units (DPUs), Artificial Intelligence (AI) processors or AI inference units and/or other accelerators, FPGAs and/or other programmable logic (used for compute purposes), etc. While some of the diagrams herein show the use of processors and/or CPUs, this is merely exemplary and non-limiting. Generally, any type of XPU may be used in place of a CPU or processor in the illustrated embodiments.

In the foregoing embodiments, the terms root (and root node), intermediate node(s) and leaf node(s) are used. One of skill in the distributed processing arts will recognize that in the context of an MPI implementation, each of these nodes is an MPI rank, which in turn is a process that executes on a processing element. Thus, a node may represent a physical entity, such as a separate compute platform or processor, or may represent a logical or virtual entity, such as a software-defined node executing on a compute platform. Moreover, some hardware architectures may employ large arrays of processing elements (e.g., a 2D or 3D array of processors, processor cores, processing engines, etc.), wherein an MPI rank process may be executed on a given processing element, including virtual processing elements. In virtualized environments, MPI rank processes may execute on virtual elements such as virtual machines and containers.

In addition to supporting MPI implementations, the principles and teachings disclosed herein may be applied to other distributed runtimes, such as but not limited to OpenSHMEM.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'm', 'n', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in a distributed compute environment comprising a plurality of ranks including a root, a plurality of intermediate nodes, and a plurality of leaf nodes, each of the plurality of ranks comprising a process executing on a compute platform having a communication interface, the method including operations implemented in one or more of the communication interfaces comprising:
   employing collectives to transfer data between parent ranks and child ranks;
   sending control messages from children of a collective to the parent of the collective informing the parent that the children of the collective have free buffers ready to receive data; and
   for a collective, determining at a communication interface of the parent of the collective that a control message has been received from each child in the collective indicating the child has a free buffer to trigger sending data from the parent to the children in the collective,
   wherein following an initial transfer of data from the root to an intermediate node using a first collective, data are transferred from the root to the intermediate node using subsequent collectives under which control messages are sent from the intermediate node to the root at the end of a collective, so that a next time a collective is called, the control messages do not appear on the critical path of the collective operation.

2. The method of claim 1, further comprising:
   at a communication interface for multiple child intermediate nodes comprising children in a collective having the root as a parent,
   pre-posting one or more buffers;
   sending a Ready To Receive (RTR) message to the root indicating the intermediate node has a free buffer ready to receive data;
   at a communication interface for the root,
   detecting an RTR message has been received from each child intermediate node; and, in response thereto,
   sending data to each of the child intermediate nodes using a collective.

3. The method of claim 2, wherein the plurality of intermediate nodes that are children of the root is m, further comprising:
   at the communication interface for the root,
   pre-posting m receives;
   implementing a counter with a threshold set to m;
   incrementing the counter for each RTR message received from an intermediate node;
   when the counter=m, sending the data to the child intermediate nodes using the collective.

4. The method of claim 2, further comprising:
   at a communication interface for each a plurality of child leaf nodes that are children of an intermediate node that is a parent for a collective,
   pre-posting one or more memory buffers;
   sending an RTR message to the intermediate node indicating a buffer is available to receive data;
   at a communication interface for the intermediate node,
   detecting an RTR message has been received from each of the plurality of child leaf nodes; and, in response thereto,
   sending data to each of the plurality of child leaf nodes using the collective.

5. The method of claim 4, wherein the plurality of child leaf nodes comprises n leaf nodes, further comprising:
   at a communication interface for the intermediate node,
   posting n receives;
   implementing a counter with a threshold set to n;
   receiving data from the root as part of a first collective;
   incrementing the counter for each RTR message received from a child leaf node;
   when the counter=n, sending at least a portion of the data received from the root to the plurality of child leaf nodes as part of a second collective.

6. The method of claim 1, wherein the collectives are Message Passing Interface (MPI) collectives.

7. The method of claim 1, wherein following an initial transfer of data from a parent intermediate node to a plurality of child leaf nodes using a first collective, data are transferred from the intermediate nodes to the child nodes using subsequent collectives under which control messages are sent from child nodes to the intermediate node at the end of a collective, so that a next time a collective is called, the control messages do not appear on the critical path of the collective.

8. The method of claim 1, wherein the communication interface comprises one of a network adaptor, network interface controller, host fabric interface, or host controller adaptor.

9. The method of claim 1, wherein the communications interface includes instructions for implementing MPI collectives, and wherein the instructions are executed on a processing element in the communication interface.

10. A system comprising a plurality of compute platforms coupled in communication in a distributed compute environment, each of the plurality of compute platforms executing one or more ranks and including a communication interface, the ranks including a root, a plurality of intermediate nodes, and a plurality of leaf nodes, wherein the communication interfaces are configured to:
   employ collectives to transfer data between parent ranks and child ranks;
   send messages from children of a collective to the parent of the collective informing the parent that the children of the collective have free buffers ready to receive data; and
   for a collective, determine at a communication interface for the parent of the collective that a message has been received from each child in the collective indicating the child has a free buffer to trigger sending data from the parent to the children in the collective,
   wherein following an initial transfer of data from the root to an intermediate node using a first collective, data are transferred from the root to the intermediate node using subsequent collectives under which control messages are sent from the intermediate node to the root at the end of a collective, so that a next time a collective is called, the control messages do not appear on the critical path of the collective operation.

11. The system of claim 10, wherein the distributed compute environment comprises a disaggregated architecture including compute platforms interconnected via peer-to-peer links.

12. The system of claim 10, wherein the distributed compute environment comprises a networked environment in which the computer platforms are interconnected via one or more networks and the communication interfaces comprise network interfaces.

13. The system of claim 10, wherein the collectives comprise Message Passing Interface (MPI) collectives.

14. A method implemented in a distributed compute environment comprising a plurality of ranks including a root, a plurality of intermediate nodes, and a plurality of leaf nodes, each of the plurality of ranks comprising a process executing on a compute platform having a communication interface, the method including operations implemented in one or more of the communication interfaces comprising:
  employing collectives to transfer data between parent ranks and child ranks;
  sending control messages from children of a collective to the parent of the collective informing the parent that the children of the collective have free buffers ready to receive data; and
  for a collective, determining at a communication interface of the parent of the collective that a control message has been received from each child in the collective indicating the child has a free buffer to trigger sending data from the parent to the children in the collective,
  wherein following an initial transfer of data from a parent intermediate node to a plurality of child leaf nodes using a first collective, data are transferred from the intermediate nodes to the child nodes using subsequent collectives under which control messages are sent from child nodes to the intermediate node at the end of a collective, so that a next time a collective is called, the control messages do not appear on the critical path of the collective.

15. The method of claim 14, further comprising:
  at a communication interface for multiple child intermediate nodes comprising children in a collective having the root as a parent,
    pre-posting one or more buffers;
    sending a Ready To Receive (RTR) message to the root indicating the intermediate node has a free buffer ready to receive data;
  at a communication interface for the root,
    detecting an RTR message has been received from each child intermediate node; and, in response thereto,
    sending data to each of the child intermediate nodes using a collective.

16. The method of claim 15, wherein the plurality of intermediate nodes that are children of the root is m, further comprising:
  at the communication interface for the root,
    pre-posting m receives;
    implementing a counter with a threshold set to m;
    incrementing the counter for each RTR message received from an intermediate node;
    when the counter=m, sending the data to the child intermediate nodes using the collective.

17. The method of claim 15, further comprising:
  at a communication interface for each a plurality of child leaf nodes that are children of an intermediate node that is a parent for a collective,
    pre-posting one or more memory buffers;
    sending an RTR message to the intermediate node indicating a buffer is available to receive data;
  at a communication interface for the intermediate node,
    detecting an RTR message has been received from each of the plurality of child leaf nodes; and, in response thereto,
    sending data to each of the plurality of child leaf nodes using the collective.

18. The method of claim 17, wherein the plurality of child leaf nodes comprises n leaf nodes, further comprising:
  at a communication interface for the intermediate node,
    posting n receives;
    implementing a counter with a threshold set to n;
    receiving data from the root as part of a first collective;
    incrementing the counter for each RTR message received from a child leaf node;
    when the counter=n, sending at least a portion of the data received from the root to the plurality of child leaf nodes as part of a second collective.

19. The method of claim 14, wherein the collectives are Message Passing Interface (MPI) collectives.

20. The method of claim 14, wherein following an initial transfer of data from the root to an intermediate node using a first collective, data are transferred from the root to the intermediate node using subsequent collectives under which control messages are sent from intermediate node to the root at the end of a collective, so that a next time a collective is called, the control messages do not appear on the critical path of the collective operation.

21. The method of claim 14, wherein the communication interface comprises one of a network adaptor, network interface controller, host fabric interface, or host controller adaptor.

* * * * *